United States Patent Office 3,123,168
Patented Mar. 3, 1964

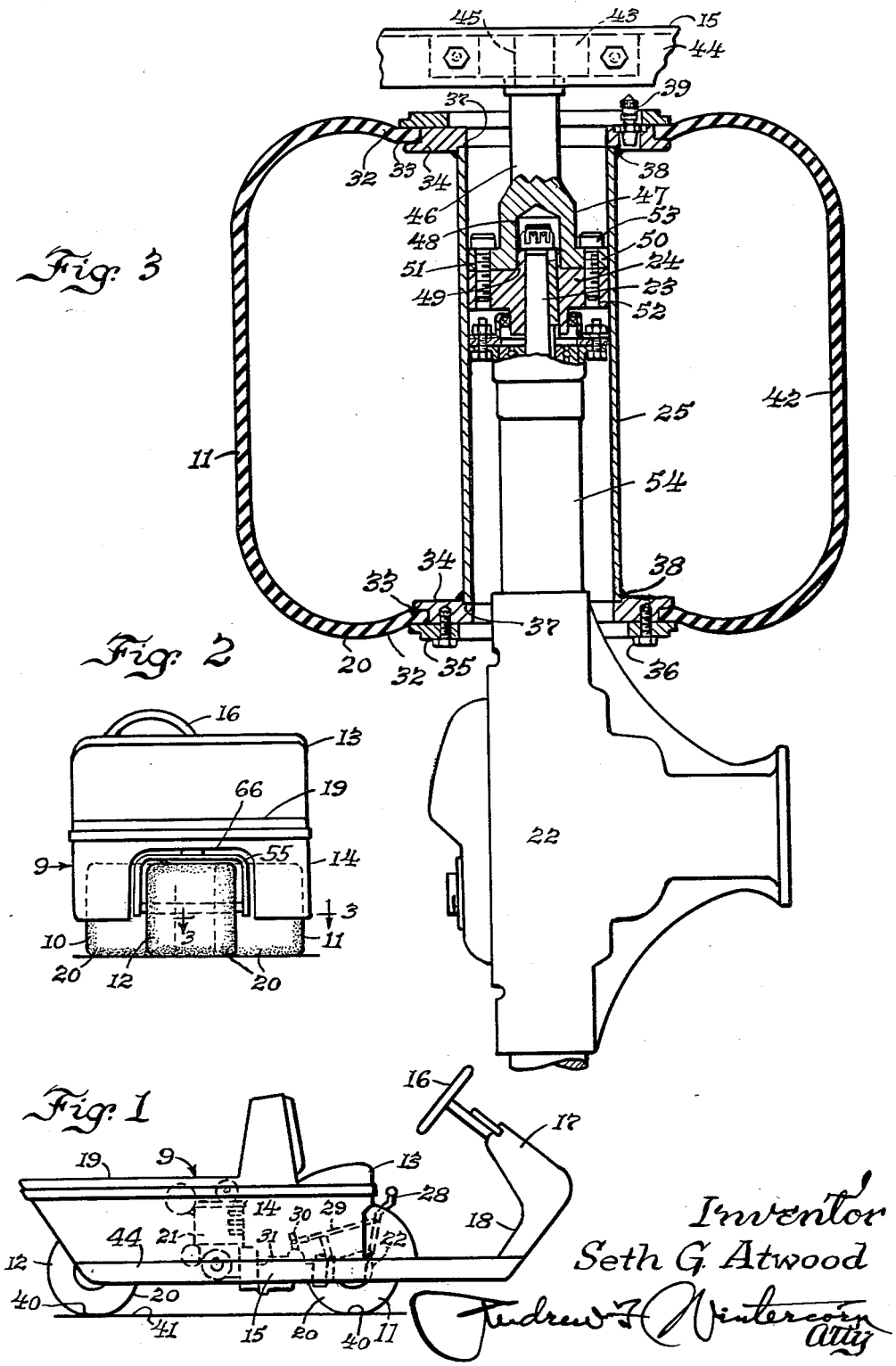

3,123,168
DRIVE ARRANGEMENT FOR GOLF CAR HAVING LOW PRESSURE TIRES
Seth G. Atwood, 2121 Harlem Blvd., Rockford, Ill.
Filed Apr. 11, 1960, Ser. No. 21,356
9 Claims. (Cl. 180—27)

This invention relates to a golf car or the like and is more particularly concerned with the following improvements, all designed with a view to avoiding objections noted in vehicles of this type heretofore available, and especially that of making ruts and ruining the grass by reason of bad weight distribution, rear wheel drive and single front wheel steering:

(1) Low pressure, elongated, pillow type tires are employed to reduce the unit bearing pressure to less than 5 lbs. per square inch tread pressure on the turf as compared with too many pounds per square inch tread pressure with other vehicles in this field, thereby enabling more of these vehicles to be used with far less noticeable ruts and damage to grass, even where the soil conditions are such that ruts were considered to be inevitable.

(2) The employment of the novel, low pressure, elongated, pillow type tires made possible and practical for a vehicle of the present type, the elimination of separate springing and, therefore, stub shafts are provided in a coaxial relationship to the two front wheel drive shaft sections and bolted at their inner ends to the drive hubs and journaled at their outer ends in bearings mounted directly on the side members of the frame, the drive hubs being welded in the elongated, tubular wheel hubs near, but spaced inwardly from, the outer ends thereof, so that drive differential units of a small size, readily available in large quantities at a moderate cost, may be used, and there is also the advantage that the stub shafts which form bearing extensions for the drive differential can be correspondingly shorter and less strain is imposed thereon under rough driving and handling of the vehicle and hence, likelihood of breakage or premature wear on parts is reduced.

The invention is illustrated in the accompanying drawings, in which—

FIGS. 1 and 2 are a side view and rear view, respectively, of a golf car, embodying the improvements of my invention, and FIG. 3 is a view partly in horizontal section on the line 3—3 of FIG. 2 and partly in top plan view, and the right front wheel showing its low pressure, elongated, pillow type tire and its drive connections and frame mounting.

The same reference numerals are applied to corresponding parts throughout these views.

Referring first briefly to FIGS. 1 and 2, these show a golf car or the like indicated generally by the reference numeral 9 having two co-axially arranged front drive wheels 10 and 11 and a single rear steering wheel 12. The seat 13 for the driver and a passenger is provided on the body 14 slightly forwardly of the middle of the frame 15 and almost directly over the front wheels, behind the steering wheel 16 mounted in the rearwardly inclined front end portion 17 disposed substantially at right angle to the upwardly and forwardly inclined toeboard portion 18. The rear portion 19 of the body in the case of a golf car has vertical wells in it extending in a fore and aft direction to accommodate bags of golf clubs, but in the case of a utility car, will have what amounts to the floor of a wagon box with upwardly projecting side walls and a hinged tailgate to enable hauling all sorts of loads within the power capacity and load carrying capacity of the vehicle. However, when the overall weight of the vehicle, which is approximately 765 lbs. plus the weight of the driver and a passenger, each weighing approximately 200 lbs. plus the weight of two bags of golf clubs, each weighing approximately 25 lbs., are all taken into consideration, the total weight being approximately 1215 lbs., the weight distribution with a conventional three-wheel golf car of the same weight having a single front steering wheel and two rear drive wheels was approximately 45% (approximately 547 lbs.) on the front wheel and approximately 55% (approximately 668 lbs.) on the rear wheels. In the vehicle of my invention, by virtue of the reversal of the wheel arrangement, using two front drive wheels and a single rear steering wheel, with the seat arranged substantially directly over the two front drive wheels as herein disclosed, I obtain the following weight distribution:

(1) Approximately 33⅓% (approximately 405 lbs.) on the rear steering wheel and
(2) Approximately 66⅔% (approximately 810 lbs.) on the two front drive wheels, with the result that the golf car or other similar vehicle no longer is subject to the usual objections that went with the old arrangement, namely, lunging and digging of the front steering wheel on steep descents, making steering difficult and sometimes hazardous and causing damage to the turf, and on steep ascents, giving a feeling of insufficient front end weighting and consequent insecurity and improper steering action. Operation on level ground is also improved with the present arrangement because sufficient weight is imposed on the drive wheels to insure good traction and reduce likelihood of slippage on wet turf, despite the low unit pressure to which reference is made herein and which is an advantage obtained as a result of the use of the elongated, low pressure, pillow type tires 20. A factor in the weight distribution is the mounting of the engine 21 on the frame 15, as indicated in dotted lines in FIG. 1, at the middle of the body 14 directly behind the seat 13 and about midway between the front and rear wheels. This engine transmits drive through the differential 22 to the two front wheels 10 and 11, which have drive shaft sections 23 drivingly connected therewith through drive hubs 24 welded or otherwise suitably secured in the elongated tubular hubs 25 of these wheels. The car has the usual accelerator pedal and brake pedal, not shown. At 28 in FIG. 1 is indicated the shift lever, movable from a neutral position to a forward drive or a rearward drive position, this lever being connected by means of a link 29 with a lever 30 projecting upwardly from the transmission housing 31 between the engine 21 and the differential 22.

The low pressure, elongated, pillow type tires 20 are of the tubeless type and their end walls 32 have circular beads 33 clamped in annular grooves defined between the rims of inner rings or plates 34 and outer rings 35 that are bolted together as indicated at 36, the inner rings or plates 34 having annular grooves 37 on their inner sides for the centering of the ends of the hub 25 therein and being welded to the hub 25 as indicated at 38. One of these rings or plates 34 carries a Schrader valve 39 for inflation of the tire to approximately five pounds (5 lbs.) pressure. Inasmuch as these tires 20 are intended to flatten out appreciably, as indicated at 40 in FIG. 1, where they contact the turf 41 in order to spread the weight of the vehicle and its load over a much larger area than is true of pneumatic tires generally and has been true in the case of pneumatic tires on other golf cars and similar vehicles, the side walls 32 and the peripheral wall 42 are made relatively thin and much more readily flexible than has been the practice in the pneumatic tire art in the past, and this increased flexibility presented a problem in the matter of transmitting drive to the wheels through their center hubs, as the torsional strains on the end walls 32 were quite destructive due to the amount of yield in these walls causing too much angular displacement of the hubs in relation to the periphery of the tires. However, this difficulty was overcome by increasing the radius of plates 34 and bead 33; for example, for a tire of 8 inch radius the plates 34 and rings 35 are of 3 inch radius. The amount of angular displacement of the hub with respect to the periphery with this construction is kept small enough to eliminate any likelihood of the side walls 32 tearing loose from the hub even under the hardest service. The tread pressure is reduced with the present low pressure, elongated, pillow type tires down to less than 5 lbs. per square inch—actually as low as 4.6 lbs. per square inch in the case of a golf car weighing 765 lbs. The approximate dimensions of the rectangular area covered by the flattened bottom portion of each of the three tires 10, 11 and 12 is 8.8 inches by 10 inches. The 88 square inches of area per tire multiplied by three, gives a total area of 264 square inches of tread area which, multiplied by 4.6, gives a total of 1214.4 lbs. which allows for a load of approximately 450 lbs. It goes practically without saying that with so large an area of tread engagement with the turf, the likelihood of slippage is reduced to a minimum, even in the event of sudden accelerations on steep grades, and it is no wonder, therefore, that it has been found to be entirely practical and feasible to provide the tires 20 without anti-skid tread surfaces commonly looked for and expected in all tires in the past, the present tires being smooth on their outer peripheries and being, therefore, all the more gentle in their effect upon grass and other plant life.

The front wheels 10 and 11, as previously mentioned, have drive hubs 24 welded or otherwise suitably secured in their tubular hubs 25 and, inasmuch as the pillow type tires 20 provide sufficient cushioning action in addition to all of the other advantages mentioned, there is no need for separate springing. Consequently, I provide bearings 43 on the side members 44 of the frame 15 in which the reduced ends 45 of stub shafts 46, which constitute rigid extensions of the drive shaft sections 23, are journaled. The stub shafts 46 have enlarged, hollow, inner end portions 47, the axial bores 48 in which receive pilot projections 49 provided on the drive hubs 24, while annular flanges 50 have holes 51 provided therein registering with threaded holes 52 provided in the hubs 24 so that bolts 53 entered through the holes 51 and threaded in the holes 52 serve to fasten the stub shafts 46 securely in rigid coaxial relationship to the drive shaft sections 23. The drive hubs 24 are located outwardly from the middle of the hubs 25, far enough to permit use of differentials 22 with housing extensions 54 and drive shaft sections 23 of a length easily available in large quantities at reasonably low cost, without having the front drive wheels 10 and 11 spaced farther apart than is permissible for the width of a golf car, and this location of the drive hubs 24, that far out from the central planes of the front wheels, gives a further distinct advantage in that it makes it possible to use stub shafts 46 short enough to make this kind of mounting practical, and the loads at both ends of the stub shafts are kept low enough so that there is no danger of breakage nor of undue wear and tear on any of the parts, even if the golf car is given fairly rough usage.

It is believed that the foregoing description conveys a good understanding of the objects and advantages of my invention. The appended claims have been drawn to cover all legitimate modifications and adaptations.

I claim:

1. In a golf car or the like, a frame carrying a prime mover, ground-engaging wheels mounted on the frame for its support, drive, and steering, each wheel having a low pressure pillow-type tire with thin readily flexible side and peripheral walls, the tire being elongated axially to a length that is greater than the diameter, whereby, in view of the low pressure and the thin readily flexible side and peripheral walls, to run semi-flat, for increased area of tread contact and proportionately lower unit pressure on the turf and also for good traction, each tire having a circular drive bead concentric with each end connected to the peripheral portion of a central circular end plate, the ratio of radius of drive bead to outside radius of tire in the pillow type tires being such that the car is adapted to depend upon the tires exclusively to absorb road shock, a coaxially arranged pair of said wheels being drive wheels and having tubular hubs connected to the central portions of said end plates, drive connections for the prime mover with said wheels including a differential between said wheels and drive shaft sections extending therefrom to and drivingly connected in the hubs of said wheels, the structure also including stub shafts coaxially arranged with said drive shaft sections and rigidly connected therewith to form extensions thereof for bearing support on the frame, and bearings on said frame in which the outer ends of said stub shafts are rotatably mounted for mounting of said wheels directly on said frame.

2. In a golf car or the like, a frame carrying a prime mover, ground-engaging wheels mounted on the frame for its support, drive, and steering, each wheel having a low pressure pillow-type tire with thin readily flexible side and peripheral walls, the tire being elongated axially to a length that is greater than the diameter, whereby, in view of the low pressure and the thin readily flexible side and peripheral walls, to run semi-flat, for increased area of tread contact and proportionately lower unit pressure on the turf and also for good traction, each tire having a circular drive bead concentric with each end connected to the peripheral portion of a central circular end plate, the ratio of radius of drive bead to outside radius of tire in the pillow type tires being such that the car is adapted to depend upon the tires exclusively to absorb road shock, one of said wheels being a drive wheel adapted to be mounted for rotation directly on said frame, said wheel having a tubular hub, and the drive connections for the prime mover including a drive shaft extending into said hub and drivingly connected therewith, the structure also including a stud shaft coaxially arranged with respect to said drive shaft and rigidly connected therewith to form an extension thereof for bearing support on the frame, and a bearing on said frame in which the outer end of said stub shaft is rotatably mounted for mounting the wheel directly on said frame.

3. In a power-driven vehicle, the combination of a horizontal frame, a drive wheel having a tubular hub, a horizontal axle housing having a drive shaft received in bearings therein and extending therefrom, a drive hub drivingly connected with the end of said shaft and secured in the tubular hub of said wheel to transmit drive thereto, a stub shaft having a hollow end piloted on said drive hub in coaxial relationship thereto and rigidly connected therewith so as to turn with the wheel, and a bearing on said frame in which the outer end of said stub shaft is journalled for direct mounting of the wheel on said frame.

4. A structure as set forth in claim 3 wherein the outer end portion of said stub shaft is reduced to provide a coaxial bearing trunnion that is received in the bearing, and an annular shoulder defined at the inner end of said trunnion which by abutment with the bearing assumes the end thrust on said shaft.

5. In a power-driven vehicle of the class described, the combination of a frame having spaced parallel side members, a pair of coaxially disposed drive wheels each comprising an elongated tubular hub carrying a low pressure pillow type pneumatic tire that is elongated axially to a length greater than the radius, the two wheels together taking up the major portion of the width of the frame and leaving only a relatively narrow space between said wheels for a differential housing when the wheels are disposed in closely spaced relationship to said frame side members, a drive differential housing disposed between said wheels having tubular extensions of small diameter relative to the wheel hubs extending into said hubs to a point intermediate the ends thereof, drive shaft sections mounted in bearings in said tubular extensions and extending from the outer ends thereof and drivingly connected with the wheel hubs, bearings on the frame side members, and stub shafts mounted in said bearings at one end and secured rigidly at their other end in coaxial relationship to said drive shaft extensions and hubs.

6. A structure as set forth in claim 5 wherein the bearings and stub shafts assume end-thrust so as to maintain a predetermined spaced relationship between either of said wheels and the adjacent frame side member.

7. A structure as set forth in claim 5 wherein the drive shaft sections are secured to the wheel hubs outwardly from the middle thereof, whereby shorter stub shafts can be used and less strain is imposed thereon at their both ends.

8. A structure as set forth in claim 5, wherein the outer end portion of each stub shaft is reduced to provide a coaxial bearing trunnion that is received in the bearing on the frame side member and an annular shoulder defined at the inner end of said trunnion which by abutment with the bearing assumes the end thrust on said shaft.

9. A structure as set forth in claim 5 wherein the drive shaft sections are secured to the wheel hubs outwardly from the middle thereof, whereby shorter stub shafts can be used and less strain is imposed thereon at their both ends, the outer end portion of each stub shaft being reduced to provide a coaxial bearing trunnion that is received in the bearing on the frame side member and an annular shoulder defined at the inner end of said trunnion which by abutment with the bearing assumes the end thrust on said shaft.

References Cited in the file of this patent

UNITED STATES PATENTS

| | | |
|---|---|---|
| 1,424,822 | Herds | Aug. 8, 1922 |
| 1,548,695 | Winchell | Aug. 4, 1925 |
| 1,616,295 | Yourtee | Feb. 1, 1927 |
| 1,876,068 | Musselman | Sept. 6, 1932 |
| 2,561,576 | Johnson | July 24, 1951 |
| 2,617,489 | Nash | Nov. 11, 1952 |
| 2,802,541 | Albee | Aug. 13, 1957 |
| 2,824,592 | Neisler et al. | Feb. 25, 1958 |
| 2,970,665 | Russler et al. | Feb. 7, 1961 |
| 2,973,048 | Jensen | Feb. 28, 1961 |
| 2,986,226 | Elliott et al. | May 30, 1961 |
| 3,023,826 | Larson et al. | Mar. 6, 1962 |

FOREIGN PATENTS

| | | |
|---|---|---|
| 687,444 | Germany | Jan. 29, 1940 |

OTHER REFERENCES

The SAE Journal magazine, March 1959, page 13.